(12) United States Patent
Gupta et al.

(10) Patent No.: US 9,184,982 B2
(45) Date of Patent: Nov. 10, 2015

(54) BALANCING THE ALLOCATION OF VIRTUAL MACHINES IN CLOUD SYSTEMS

(71) Applicant: Hewlett-Packard Development Company, L.P., Houston, TX (US)

(72) Inventors: Abhishek Gupta, Urbana, IL (US); Dejan S. Milojicic, Palo Alto, CA (US); Paolo Faraboschi, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 13/741,949

(22) Filed: Jan. 15, 2013

(65) Prior Publication Data
US 2014/0201371 A1 Jul. 17, 2014

(51) Int. Cl.
*G06F 15/173* (2006.01)
*H04L 29/08* (2006.01)
*G06F 9/455* (2006.01)
*H04L 29/06* (2006.01)

(52) U.S. Cl.
CPC ...... *H04L 29/08234* (2013.01); *G06F 9/45558* (2013.01); *H04L 67/10* (2013.01); *H04L 67/38* (2013.01); *G06F 2009/4557* (2013.01)

(58) Field of Classification Search
USPC .......................................... 709/226, 203, 219
See application file for complete search history.

(56) References Cited

U.S. PATENT DOCUMENTS

| 2012/0042256 | A1 | 2/2012 | Jamjoom et al. | |
| 2012/0096470 | A1 | 4/2012 | Bartfai-Walcott et al. | |
| 2012/0239739 | A1 | 9/2012 | Manglik et al. | |
| 2013/0042003 | A1* | 2/2013 | Franco et al. | 709/226 |
| 2014/0173113 | A1* | 6/2014 | Vemuri et al. | 709/226 |

OTHER PUBLICATIONS

VMware Product DataSheet ~ "VMware Distributed Resource Scheduler" ~ 2009 ~ pp. 3.
Pavvar. C.S. et al., Priority Based Dynamic Resource Allocation in Cloud Computing, (Research Paper), Retrieved May 17, 2015, 6 Pages.
Xu, L. et al., Smart-DRS: a Strategy of Dynamic Resources Scheduling in Cloud Data Center (Research Paper), IEEE International Conference on Cluster Computing Workshops, Sep. 24-26, 2012, pp. 120-127.

* cited by examiner

*Primary Examiner* — El Hadji Sall
(74) *Attorney, Agent, or Firm* — Brooks, Cameron & Huebsch, PLLC

(57) ABSTRACT

Methods, systems, and machine-readable and executable instructions are provided for balancing the allocation of a number of virtual machines (VMs) in clouds systems. Balancing the allocation of VMs in cloud systems can include determining a number of relationships of a plurality of nodes in a cloud system. Balancing the allocation of VMs in cloud systems can include assigning a number of VMs to the plurality of nodes in response to a request based on a criteria of the request and the number of relationships of the plurality of nodes to balance VMs in the cloud system, where the criteria include a type and a priority for each of the number of VMs.

13 Claims, 4 Drawing Sheets

BALANCING THE ALLOCATION OF VIRTUAL MACHINES IN CLOUD SYSTEMS

BACKGROUND

A cloud system may refer to computational resources that may be linked through the use of computer networks. Allocation of the computation resources may be varied to meet changing demands upon the cloud system.

DETAILED DESCRIPTION

Balancing the allocation of virtual machines (VMs) in cloud systems can help improve resource utilization of a cloud system, for instance, by assigning a number of VMs to the cloud system based on a type and/or a priority of each of the number of VMs to balance the allocation of VMs in the cloud system. With increasing pressure on organizations to improve performance of their cloud systems, the organizations may seek to increase efficiencies, for instance, by pursuing efficient assignment and/or prioritization of VMs in cloud systems.

Some previous techniques for allocation of VMs in cloud systems may rely upon user inputs and/or application-specific static partitioning of clusters into availability zones. However, allocation of VMs in cloud systems based upon user inputs and/or application-specific partitioning of clusters into availability zones have proven to be complex and/or costly. That is, such approaches do not account for dynamically changing environments, do not incorporate intelligence for performing automated and/or simultaneous assignment of VMs (e.g., multiple VMs corresponding to a hosted application(s)), and/or do not enable prioritization of VMs, among other inefficiencies. Nor do such techniques facilitate dynamically fulfilling the respective capacities of a plurality of nodes in cloud systems. As generally described herein, nodes may refer to computing, storage, and/or networking resources in cloud systems.

Figure 1:
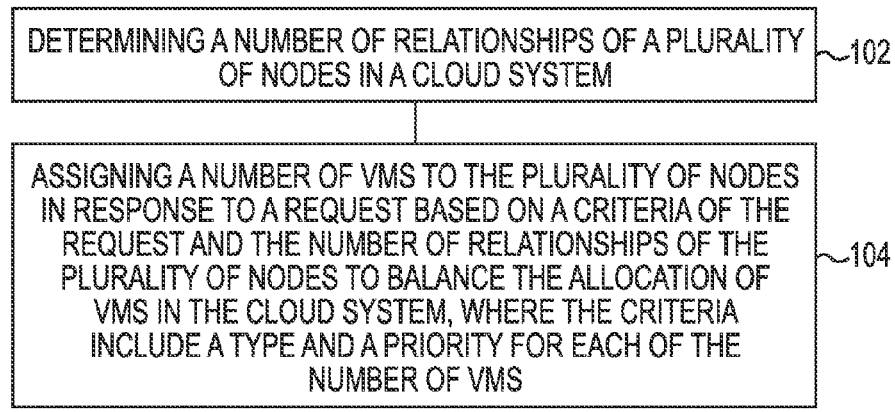
FIG. 1 illustrates a flow chart of an example of a method for balancing the allocation of virtual machines in cloud systems according to the present disclosure.
Figure 2:
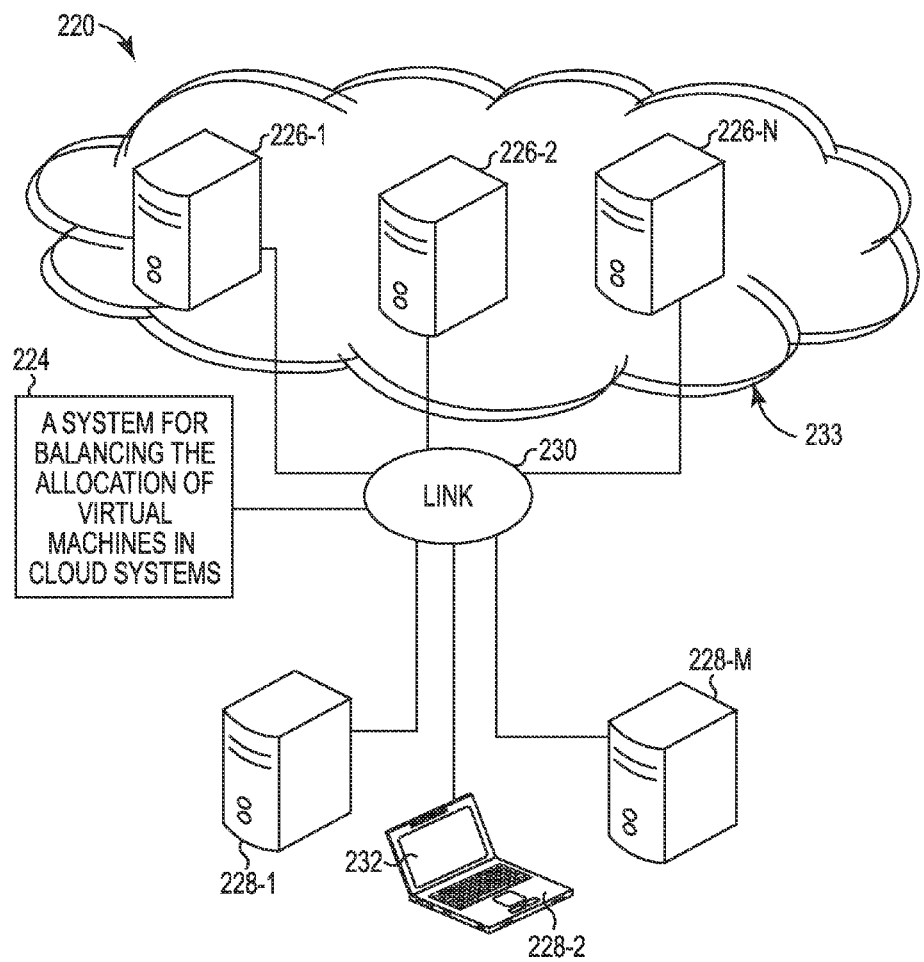
FIG. 2 illustrates a diagram of an example of an environment in which various examples of the present disclosure may be implemented.

In contrast, examples of the present disclosure include methods, systems, and machine-readable and executable instructions for balancing the allocation of VMs in cloud systems. FIG. 1 illustrates a flow chart of an example of a method for balancing the allocation of virtual machines (VMs) in cloud systems according to the present disclosure. As shown at 102, in various examples, the method can include determining a number of relationships of a plurality of nodes in a cloud system. Determining can include executing instructions stored in memory to determine a number of relationships of a plurality of nodes in a cloud system. As shown at 104, in various examples, the method can include assigning a number of VMs to the plurality of nodes in response to a request based on a criteria of the request and the number of relationships of the plurality of nodes to balance the allocation of VMs in the cloud system. Assigning can include executing instructions stored in memory to assign a number of VMs to the plurality of nodes in response to a request. The number of VMs can be assigned by a user (e.g., an IT administrator), for example, via a graphical user interface (e.g., 232 as illustrated in FIG. 2), and/or automatically assigned to the plurality of nodes according to a service level agreement (SLA) in response to a request, among others. In various examples, the criteria can include a type and/or a priority for each of the number of VMs, among other criteria.

In the following detailed description of the present disclosure, reference is made to the accompanying drawings that form a part hereof, and in which is shown by way of illustration how examples of the present disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As will be appreciated, elements shown in the various examples herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features. In addition, "for example" and similar phrasing is intended to mean, "by way of example and not by way of limitation".

Balancing the allocation of VMs in cloud systems can include assigning and/or prioritizing a number of VMs in the cloud system to accomplish a given objective. An objective can refer to a particular function, for example, executing a particular application and/or a task within a particular application. An objective can be provided by a user (e.g. an IT administrator) and/or by a SLA. A particular objective can be categorized as a high performance computing (HPC) objective, or a non-HPC objective, among other types.

An HPC objective can refer to (e.g., enable) a given function (e.g., running a particular application) of the organization having an amount of dedicated computing, storage, and/or communication resources to accomplish its objective. A dedicated resource can refer to a resource committed to perform a given function of an HPC type of VM assigned thereto. Examples of resources that can be dedicated include computing, storage, and/or networking resources in cloud systems. Such resources can be dedicated by a user (e.g., an IT administrator) to perform a given function. A non-HPC objective can refer to an objective that corresponds to a given non-HPC function of the organization that may execute on a dedicated resource or may execute on a shared resource (e.g., shared with another VM) to accomplish its particular non-HPC function. Such a determination (e.g., whether a given objective is an HPC type of VM or non-HPC type of VM) can be made by a user (e.g., an IT administrator) and/or be based upon a SLA.

Categorizing an objective and/or a number of objectives can enable assignment and/or prioritization of the number of VMs to accomplish the objective(s). For instance, the number of VMs can be categorized as a particular type of VM based upon a categorization of an objective corresponding to the number of VMs. That is, a "type" of VM can represent a categorization applied to a particular VM and/or a number of VMs prior to assignment and/or prioritization. For example, a number of VMs can be categorized as an HCP type of VMs or as a non-HCP type of VMs, among other categorizations. As described herein, an "HPC type of VM" refers to a VM and/or a number of VMs that can be allocated (e.g., assigned and/or prioritized) to accomplish an HPC objective. As described herein, a "non-HPC type of VM" refers to a VM and/or a number of VMs that can be allocated to accomplish a non-HPC objective.

Such assignment and/or prioritization of the number of VMs to accomplish a given objective can enable oversubscription. Oversubscription refers to assignment of at least two or more VMs (e.g. of the number of VMs) to a given node (e.g., a CPU core of the given node) of the plurality of nodes. Oversubscription can promote fulfillment of a capacity of the given node for a comparatively higher amount of time than, for example, a node having a single VM (e.g., an HPC type of VM) dedicated to the node. That is, oversubscription can promote fulfillment of the capacity of a given node without compromising (e.g., reducing the performance) HPC performance. The capacity of a given node can be a fulfilled or available. An available capacity can refer to a number of available CPU cores and/or an available amount of memory (e.g., random access memory and/or hard disk) of a given node of the plurality of nodes and/or a communication bandwidth and latency of a node interconnection network. A fulfilled capacity can refer to a given node of the plurality of nodes having utilized (e.g., fully utilized) each of a number of CPU cores and/or an amount of memory for the given node.

For instance, a request (e.g., a single request) can include a number of VMs including a non-HPC type of VM. In some examples, assigning the number of VMs can include assigning the non-HPC type of VM to a node of the plurality of nodes having an HPC type of VM assigned thereto (e.g., assigned from a previous request). Accordingly, in some examples, assigning the number of VMs to the plurality of nodes can include oversubscribing the node by assigning at least two VMs to the node (e.g., a single CPU core of the node) of the plurality of nodes. In some examples, a result of oversubscribing the CPU core can be that the first VM assigned to the CPU core runs (e.g., runs on the CPU core) during idle time of a second VM having a comparatively higher priority assigned to the CPU core. Idle time can refer to an amount of time a task in a VM (e.g., the second VM) is not consuming CPU cycles, for example, an amount of time waiting for a response (e.g., a hard disk response and/or a network response). Advantageously, this can enable spreading the CPU time for the first VM over several time intervals and/or translate to a comparatively lower cost to run the first VM by promoting fulfillment of a capacity of the given node. Similar considerations can be applied to oversubscription of storage (e.g., disk) or networking resources.

As described herein, a "request" is any suitable means to deliver criteria corresponding to a number of VMs. The request can provide any suitable number of criteria and/or type of criteria corresponding to the number of VMs. The criteria can include a type, a priority, a nature, a number of instances (e.g., a particular number of VMs), homogeneity criteria, an objective corresponding to the number of VMs, and/or locality criteria of the number of VMs, among other criteria corresponding to the number of VMs. For example, the criteria can include a number of VMs (e.g., ten VMs) corresponding to an application (e.g., for hosting an application) and/or applications including a type and/or a priority for each of the ten VMs. The request can be provided automatically by running a given application and/or as a result of an input provided by a user (e.g., an employee), for example, via a graphical user interface (e.g., interface 232 as illustrated in FIG. 2).

In various examples, the request can include a priority corresponding to the number of VMs. As described herein, a "priority" represents an order (e.g., a hierarchal order) in which the number of VMs assigned at a node of the plurality of nodes can be run. For example, high, medium, and/or low priorities, among others. Alternatively or in addition, a request can include a nature corresponding to the number of VMs assigned (e.g., concurrently assigned) to the resource. For example, the number of VMs can be of a synchronous nature (e.g., synchronous) or asynchronous nature (e.g., asynchronous), among others. As described herein, a "synchronous" set of VMs refers to a collection of VMs that completes executing on a plurality of given nodes (e.g., on multiple CPU cores of the given nodes) before another VM not belonging to the "synchronous" set can run on the given nodes. As used herein, an "asynchronous" set of VMs can begin to execute on a given plurality of nodes without an synchronization constraints among the individual VMs of the set of VMs and the plurality of nodes, and can allow another VM to run on the plurality of given nodes (e.g., one of the plurality of given nodes) prior to completely executing the set of "asynchronous" VMs. That is, the number of VMs can include a synchronous set of VMs and/or an asynchronous set of VMs.

Accordingly, the number of VMs can be classified by priority, for example, based upon a type and/or nature of each of the number of VMs. Examples of priority classifications can include high priority (e.g., corresponding to a synchronous HPC set of VMs), medium priority (e.g., corresponding to a synchronous non-HPC set of VMs and/or an asynchronous HCP set of VMs), and/or low priority (e.g., a non-synchronous non-HPC set of VMs), among other priority classifications. However, the present disclosure is not so limited. That is, in addition to type and/or nature, priority can be assigned based upon homogeneity criteria and/or locality criteria of the number of VMs, among others. Priority can be assigned by a user, for example, via a graphical user interface (e.g., 232 as illustrated in FIG. 2), and/or automatically assigned according to an SLA, among others.

Additional advantages can be realized by monitoring the plurality of nodes and/or the number of VMs. That is, monitoring can refer to dynamically evaluating the plurality of nodes and/or the number of VMs assigned thereto using any suitable means, for example, monitoring for available capacities of the plurality of nodes. Such monitoring can enable assignment (e.g., reassignment) of the number of VMs and/or changing a priority associated with the number of VMs. For instance, the priority of the number of VMs can be dynamically changed during runtime based upon monitoring the number of VMs. Such a change of priority can enable dynamic updating of the assignment and/or prioritizing of the number of VMs that can affect individuals (e.g., real users).

As described herein, a "relationship" (e.g., a relationship of the number of relationships) refers to a number of attributes corresponding to a plurality of nodes. For instance, a relationship can refer to an attribute of a given node of the plurality of nodes and/or an attribute between two or more nodes of the plurality of nodes, among other attributes. In various examples, the number of relationships can include a capacity for a node (e.g., of each of the plurality of nodes). In various examples, the number of relationships can include a proximity relationship (e.g., a hop distance between two of more of the plurality of nodes) between the plurality of nodes. In some examples, the number of attributes can include homogeneity criteria, among other criteria. As described herein, a "homogeneity" (e.g., a homogeneity relationship) refers to the comparative similarity in type (e.g., type of manufacturer), and/or configuration of software and/or physical components (e.g., hardware) of a given node compared to another node of the plurality of nodes. Accordingly, in some examples, determining the number of relationships can include determining homogeneity relationships that satisfy the homogeneity criteria provided by the request (e.g., included in the criteria of the request), among other relationships.

Such relationships can facilitate sorting the plurality of nodes and/or assignment of the number of VMs based on the sorted plurality of nodes. In some examples, the method can include assigning the number of VMs in an order of increasing available capacity (e.g., in order from low to high amounts of available capacity) of suitable nodes. Suitable nodes can refer to nodes with enough capacity to host a given VM. Unsuitable nodes can refer to nodes without sufficient capacity to host a given VM. Determining an order of increasing available capacity can include, for example, determining if the capacity is fulfilled for each of the plurality of nodes. In some examples, the plurality of nodes with available capacities can be sorted (e.g., in order of increasing available capacity) and/or the number of VMs can be assigned to the plurality of nodes sorted by capacity.

In some examples, assignment of the number of VMs to the plurality of nodes can utilize an average, for example, a weighted average of a number of available CPU cores relative to an amount of available memory for a given node of the plurality of nodes. The weighted average can be calculated using a number of weighting coefficients, among other suitable techniques. For instance, should the number of available CPU cores be desired to have a comparatively higher weight (e.g., importance) than the amount of available memory at the given node, then respective weighting coefficients can be utilized. For example, a first weighting coefficient having a comparatively higher value (e.g., 0.6) can be multiplied by the number of available CPU cores and a second weighting coefficient having a comparatively lower value (e.g., 0.4) can be multiplied by the amount of available memory for the given node. However, the present disclosure is not so limited. That is, the average can be determined using any suitable averaging technique and/or provide an average between any suitable values to promote a desired assignment of the number of VMs.

Figure 3:
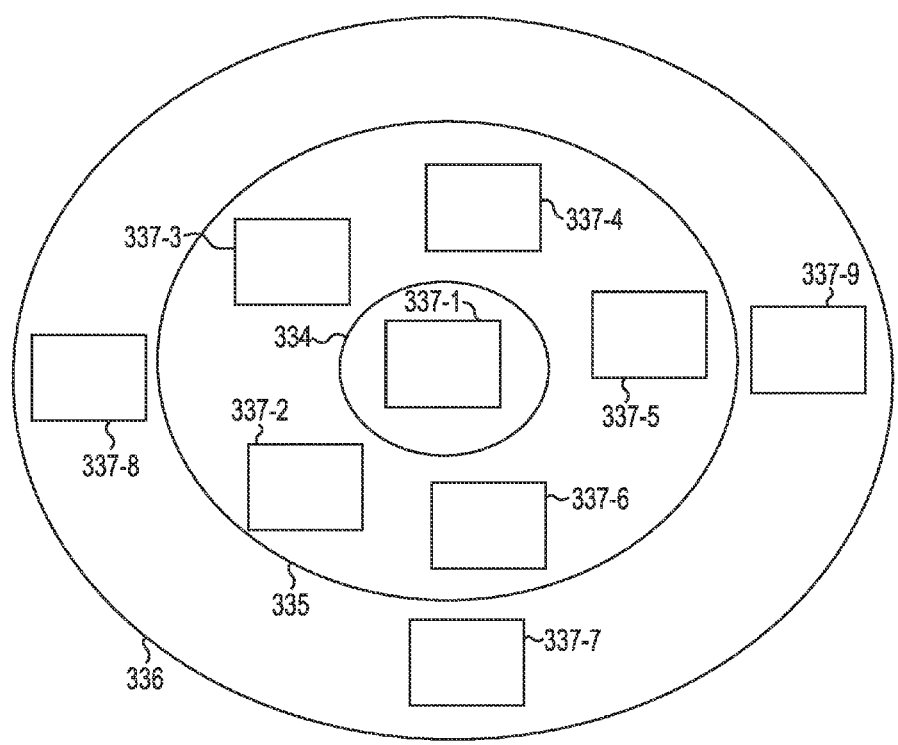
FIG. 3 illustrates a diagram of an example of a topology according to the present disclosure.

In some examples, the plurality of nodes can be sorted by a proximity relationship (e.g., a distance expressed in a number of hops across a topology between each of the plurality of nodes with respect to a reference node), as described with respect to FIG. 3. In some examples, the proximity relationship can include a number of hops between respective nodes (e.g., between a reference node and a given node of the plurality of nodes) and where the number of VMs can be assigned in an order of an increasing number of hops (e.g., between a first node and a second node). For example, the number of hops can be increased incrementally (e.g., from a hop distance of one to a hop distance of two) and each of a plurality of hops at a respective hop distance (e.g., two hops) can be fulfilled and/or determined to be unsuitable prior to incrementally increasing the hop distance (e.g., increasing to a hop distance of three).

FIG. 2 illustrates a diagram of an example of an environment in which various examples of the present disclosure may be implemented. Environment 220 is shown to include a system for balancing the allocation of virtual machines in cloud systems 224, server devices (e.g., servers 226-1, 226-2, 226-N), client devices (e.g., 228-1, 228-2, 228-M), and a link 230. The system for balancing the allocation of virtual machines in a cloud system 224, described herein, represents generally a suitable combination of physical components (e.g., hardware) and programming to balance the allocation of VMs in cloud systems.

In some examples, a request can be received including a number of VMs to be assigned to a plurality of nodes (not shown) in a cloud system 233. The cloud system 233 can include server devices (e.g., servers 226-1, . . . , 226-N). The server devices (e.g., servers 226-1, . . . , 226-N) represent generally any suitable computing devices to include the plurality of nodes, for example, the server devices (e.g., servers 226-1, . . . , 226-N), respond to requests received from the client devices (e.g., client devices 228-1, . . . , 228-M) and/or enable assignment of a number of VMs (not shown) thereto. For example, the number of VMs can be assigned to a particular node of the plurality of nodes. However, the present disclosure is not so limited. That is, the number of VMs can be assigned to the plurality of nodes, for example, server devices (e.g., servers 226-1, . . . , 226-N), in any suitable manner to promote balanced allocation of the number of VMs in cloud systems, as described herein.

A given server device (e.g., servers 226-1, . . . , 226-N) can include a web server, a mainframe, a cloud server, an application server, a client server, and/or a data server, among other types of servers. Client devices (e.g., client devices 228-1, . . . , 228-M) represent generally any suitable computing devices with browsers or other applications to receive, communicate such requests, and/or process the corresponding responses.

As illustrated in FIG. 2, a cloud system 233 can include a public cloud system, a private cloud system, and/or a hybrid cloud system. For example, an environment (e.g., IT environment) including a public cloud system and a private cloud system can include a hybrid environment and/or a hybrid cloud system. A public cloud system can include a service provider that makes resources (e.g., applications and storage), available to the public over the Internet. A public cloud system can be free or offered for a fee, for example.

A private cloud system can include computing architecture that provides hosted services to a limited number of people behind a firewall. For example, a private cloud can include an Enterprise Resource Planning (ERP) system (not show), a number of databases, and virtualization (e.g., virtual machines) (not shown). For instance, a private cloud system can include a computing architecture that provides hosted services to a limited number of the plurality of nodes (e.g., computer) behind a firewall. The ERP, for example, can integrate internal and external management information across an entire enterprise and/or organization. A number of databases can include an event database, event archive, configuration management database (CMDB), and/or a performance metric database, for example. Virtualization, for example, can include the creation of a number of virtual resources that are allocated from physical resources but not directly limited by the capabilities of particular physical resources. Examples of virtualized resources include hardware platforms, operating systems, storage devices, and/or network resources, among others. For example, a virtual storage device can provide up to a particular capacity of storage that is physically provided by one, less than one, or more than one physical storage device depending on the amount of storage space allocated to the virtual storage device and therefore not directly limited by the capabilities of any particular device(s). The public cloud system and the private cloud system can be bound together, for example, through the application in the public cloud system and the ERP in the private cloud system.

A hybrid cloud, for example, can include a mix of traditional server systems, private cloud systems, public cloud systems, and/or dynamic cloud services. For instance, a hybrid cloud can involve interdependencies between physically and logically separated services consisting of multiple systems. A hybrid cloud, for example, can include a number of clouds (e.g., two clouds) that can remain unique entities but can be bound together.

In some examples, the request can be provided via the client devices (e.g., client devices 228-1, ..., 228-M). Receiving can include executing instructions stored in memory to receive an input regarding the operation. The input can include numeric, alphabetic, and/or alpha-numeric inputs. The inputs can be provided via a keyboard, mouse, touch-screen, audio input device, among other suitable input devices to provide the input. In some examples, the client devices (e.g., client devices 228-1, ..., 228-M) can include a graphical display (e.g., a graphical user interface 232). Link 230 represents generally one or more of a cable, wireless, fiber optic, or remote connections via a telecommunication link, an infrared link, a radio frequency link, or any other connectors or systems that provide electronic communication. The link 230 can include, for example, an intranet, the Internet, or a combination of both, among other communication interfaces. Link 230 can also include intermediate proxies, routers, switches, load balancers, and the like.

In some examples, a request (e.g., including a non-high performance (non-HPC) type of VM) can be provided by a user via a graphical interface 232 of a client device (e.g., client devices 228-1, ..., 228-M). In some examples, the non-HPC type of VM can have a first execution profile and assigning the number of VMs to one of the plurality of nodes can include assigning to a node having an HPC type of VM with a second execution profile that compliments the first execution profile. Such an assignment can promote fulfillment of a capacity of a given node. For example, a first VM (e.g., a non-HPC type of VM) can have a first profile that compliments a second VM having a second profile (e.g., an HPC type of VM assigned to a given node). For example, a request can include a first VM having a first criteria for a comparatively small amount of memory (e.g., random access memory) of the given node relative to a second VM having a second criteria of the second profile. That is, the first profile can compliment the second profile that uses a comparatively larger amount of memory (e.g., memory of the given node). However, the present disclosure is not so limited. That is, execution profiles can include bandwidth, memory, homogeneity criteria, a level of CPU pinning, locality criteria (e.g., relative physical locations corresponding to each of the plurality of nodes), and/or synchronicity, among others, to provide for complimentary assignment of the number of VMs.

FIG. 3 illustrates a diagram of an example of a topology according to the present disclosure. For example, as illustrated in FIG. 3, a reference node 337-1 can be determined. Such a determination can be made, for example, by an IT administrator. A hop distance to each of the plurality of nodes (e.g., nodes 337-2, 337-3, 337-4, 337-5, 337-6, 337-8, 337-9) from the reference node (e.g., node 337-1) can be determined. In some examples, the plurality of nodes (e.g., nodes 337-2, ..., 337-9) can be sorted by hop distance to the reference node (e.g., node 337-1). For instance, a physical and/or electronic list can include groups of nodes (e.g., groups 334, 335, 336) sorted by hop distance from the reference node 337-1. For example, a group can (e.g., group 335) include all nodes (e.g., 337-2, ..., 337-6) of the plurality of nodes 333-1, ..., 337-9 having a given hop distance (e.g., all nodes having a hop distance of one) with respect to the reference node 337-1. However, the disclosure is not so limited. That is, the number of groups, the plurality of nodes, and the number of nodes within each group can include any suitable number and/or combination to promote for balanced allocation of VMs in cloud systems.

Determining such a topology, for example, by determining proximity relationships between the plurality of nodes, can promote assignment of the number of VMs based upon a hop distance associated with a given group of nodes (e.g., in order of increasing hop distance) and/or a capacity of each of the plurality of nodes (e.g., in order of increasing available capacity). For example, a VM of the number of VMs can be assigned to a node having a given hop distance (e.g., one hop) and a suitable amount of available capacity (e.g., a sufficient number of available CPU cores and/or a sufficient amount of available memory to meet or exceed a criteria of the VM) and with a comparatively low amount of capacity compared to other nodes of the same group (e.g., a group having a hop distance of one hop). Alternatively, if it is determined the capacity for the plurality of nodes having the given hop distance (e.g., one hop) are fulfilled and/or unsuitable to satisfy the criteria of the VM, then the VM can be assigned to a node of a group of the plurality of nodes with a comparatively greater hop distance (e.g., two) and suitable amount of available capacity. That is, in some examples, if it is determined the capacity of the node is unsuitable then it can be determined if the capacity of another node of the plurality of nodes having the same number of hops is suitable. If it is determined that all nodes having the same number of hops are unsuitable, then the number of hops can be increased incrementally and/or it can be determined if a node of the plurality of nodes at the increased hop distance is suitable until a node having a suitable available capacity is determined.

Assignment of the number of VMs can continue recursively until each of the number of VMs have been assigned to the plurality of nodes or the plurality of nodes satisfying the criteria (e.g., capacity) of the number of VMs have been exhausted. If each of the number of VMs can not be assigned to a node, a notification (e.g., failure notification) can be provided to the user, for example, via the graphical user interface 232. Alternatively or in addition, upon assignment of each of the number of VMs to a node, a notification (e.g., success notification) can be provided to the user, for example, via the graphical user interface 232.

Alternatively or in addition, the plurality of nodes can be sorted by a homogeneity relationship (e.g., a degree of homogeneity between each of the plurality of nodes) of the plurality of nodes, among other attributes corresponding to the plurality of nodes. In some examples, a given request can provide homogeneity criteria including the comparative size, type, and/or configuration of software and/or physical component(s) constraints that each of the number of VMs of the given request can be assigned to. Hence, in some examples, assignment of the number of VMs can depend upon available capacity of the plurality of nodes, topology (e.g., proximity relationships of the plurality of nodes), node homogeneity (e.g., homogeneity relationships of the plurality of nodes), and/or priority of the number of VMs, among others.

Some examples can include causing a display of the number of VMs of a request, criteria of a request, and/or a plurality of nodes (e.g., a graphical representation of the plurality of nodes and/or groups of nodes) within a graphical user interface in response to the input. For example, such a display can provide a display of a given request, for example, to a user providing an input corresponding to the given request. Such a display can promote assignment of the number of VMs to balance the allocation of VMs in cloud systems. Displaying can include executing instructions stored in memory to cause a display of the number of VMs including, for example, a priority associated with the number of VMs. Causing can include executing instruction stored in memory to directly cause a graphical user interface to display, for example, the number of VMs, and/or to communicate data with an expectation that it be processed by another device to cause the display of, for example the number of VMs.

Figure 4:
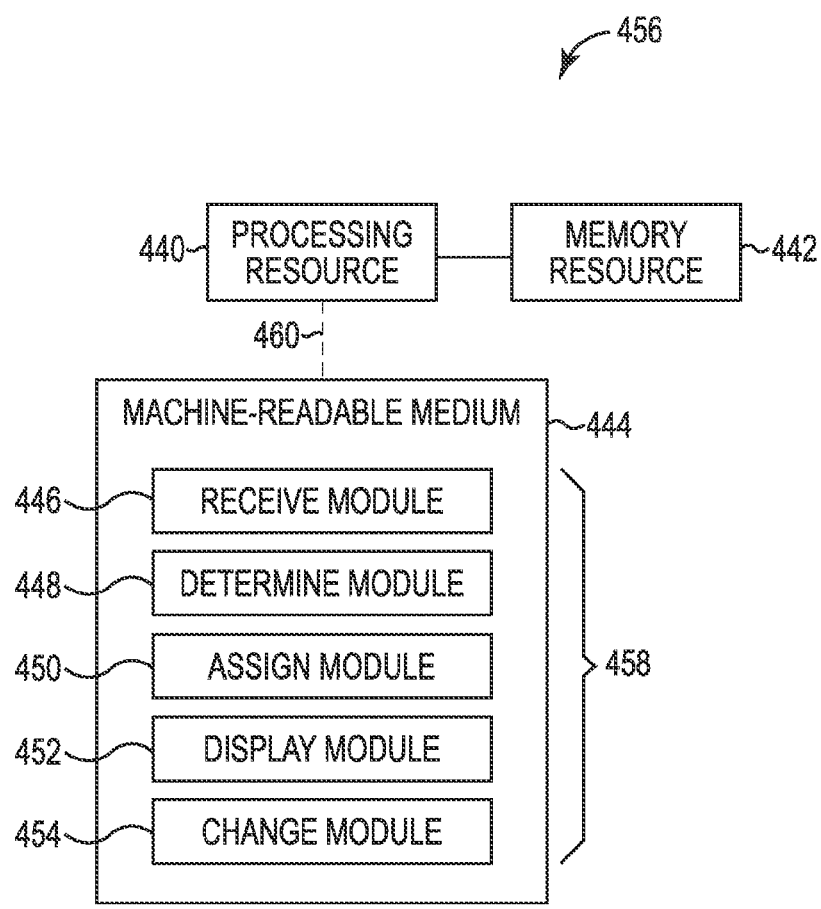
FIG. 4 illustrates a diagram of an example of a computing device according to the present disclosure.

FIG. 4 illustrates a diagram of an example of a computing device 456 according to the present disclosure. The computing device 456 can utilize software, hardware, firmware, and/or logic to perform a number of functions.

The computing device 456 can be any combination of hardware and program instructions configured for balancing the allocation of virtual machines (VMs) in cloud systems. The hardware, for example, can include processing resources 440, memory resources 442, and/or machine readable medium (MRM) 444 (e.g., computer readable medium (CRM), database, etc.). The program instructions (e.g., machine-readable instructions (MRI) 458) can include instructions stored on the MRM 444 and executable by the processing resources 440 to implement a desired function (e.g., determine a number of relationships of a plurality of nodes in a cloud system, and/or assign a number of VMs to the plurality of nodes in response to a request based on a criteria of the request and the number of relationships of the plurality of nodes to balance the allocation of VMs in the cloud system, etc.).

MRM 444 can be in communication with a number of processing resources 440. The number of processing resources 440 is not limited to the example illustrated in FIG. 4. The processing resources 440 can be in communication with a tangible non-transitory MRM 444 storing a set of MRI 458 executable by the processing resources 440, as described herein. The MRI 458 can also be stored in remote memory managed by a server and represent an installation package that can be downloaded, installed, and executed. The computing device 456 can include memory resources 442, and the processing resources 440 can be coupled to the memory resources 442.

Processing resources 440 can execute MRI 458 that can be stored on an internal or external non-transitory MRM 444. The processing resources 440 can execute MRI 458 to perform various functions, including the functions described herein. For example, the processing resources 440 can execute MRI 458 to balance the allocation of VMs in cloud systems.

The MRI 458 can include a number of modules 446, 448, 450, 452, and 454. The number of modules 446, 448, 450, 452, and 454 can include MRI 458 that when executed by the processing resources 440 can perform a number of functions including the functions described herein.

The number of modules 446, 448, 450, 452, and 454 can be sub-modules of other modules. For example, a receive module 446 and a determine module 448 can be sub-modules and/or contained within the same computing device (e.g., computing device 456). In another example, the number of modules 446, 448, 450, 452, and 454 can comprise individual modules on separate and distinct computing devices.

The receive module 446 can include MRI that when executed by the processing resources 440 can perform a number of receiving functions. For example, the receive module 446 can receive a request including a number of VMs. For example, the receive module 446 can receive a request including a non-high performance computing (non-HPC) type of VM having a first execution profile. In some examples, the receive module can store the request including the number of VMs as a set of instructions in the MRM 444.

The determine module 448 can include MRI that when executed by the processing resources 440 can perform a number of determining functions. For example, the determine module 448 can determine a number of relationships of a plurality of nodes in a cloud system. In various examples, the determine module 448 can determine a proximity relationship between the plurality of nodes (e.g., a number of hops between a first node and a second node).

An assign module 450 can include MRI that when executed by the processing resources 440 can perform a number of assigning functions. The assign module 450 can simultaneously assign the number of VMs to a node of the plurality of nodes in response to the request based on a criteria of the request and the number of relationships of the nodes and a capacity of the node to balance the allocation of VMs in the cloud system. That is, the number of VMs can be assigned to a plurality of nodes in the cloud system without any intentional delay between assignment of each of the number of VMs (e.g., assignment can occur substantially simultaneously) to the plurality of nodes. In various examples, the criteria can include a type, a priority, a requested capacity (e.g., a requested number of CPU cores, and/or a requested amount of memory space to host a given VM) corresponding to each of the number of VMs.

In some examples, the assign module 450 can assign a non-HPC VM (e.g., received by the receive module 446) to a node of the plurality of nodes having an HPC type of VM with a second execution profile that compliments the first execution profile. In some examples, the assign module 450 can access homogeneity relationships, for example, as determined by the determine module 448, and can assign the number of VMs to a node of the plurality of nodes that satisfies homogeneity criteria.

A display module 452 can include MRI that when executed by the processing resources 440 can perform a number of displaying functions. The display module 452 can cause a display of the number of VMs (e.g., a graphical representation of the number of VMs) including the priority associated with the number of VMs, for example, within a graphical user interface 232. For example, the display module 452 can display the number of VMs within the graphical user interface (e.g., 232 as illustrated in FIG. 2) in response to the receive module 446 receiving the number of VMs and/or the assign module 450 assigning the number of VMs, among others. Alternatively or in addition, the display module 452 can display the number of VMs, for example, within the graphical user interface in response to a user input.

A change module 454 can include MRI that when executed by the processing resources 440 can perform a number of changing functions. The change module 454 can dynamically change the priority associated with the number of VMs during runtime and/or cause the display of a change to the business rule. For example, the change module 454 can cause the display of the change to the priority within a graphical user interface (e.g., graphical user interface 232 illustrated in FIG. 2) as a result of the monitoring of the number of VMs. In some examples, the change module can dynamically change the priority of the number of VMs during runtime based upon monitoring of the number of VMs, as described herein. Such a dynamic change can enable assignment (e.g., reassignment) of a VM of the number of VMs and/or each of the number of VMs for a given request to another node of the plurality of nodes during runtime. For example, a priority can be changed to facilitate assignment of a VM to a node of the plurality of nodes that the VM previously could not have been assigned to.

In some examples, the changed priority can replace the previous priority stored as a set of instructions in a machine readable medium. For example, such a change can be implemented immediately following the change, after a predetermined time following the change, and/or at a predetermined time of day. For example, a predetermined time could correspond to a time generally associated with a comparatively low number of users (e.g., during nighttime hours). The predetermined time can be a regularly scheduled time (e.g., reoccurring) and/or specified by a user (e.g., an IT administrator).

A non-transitory MRM 444, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, and/or a solid state drive (SSD), etc., as well as other types of machine-readable media.

The non-transitory MRM 444 can be integral, or communicatively coupled, to a computing device, in a wired and/or a wireless manner. For example, the non-transitory MRM 444 can be an internal memory, a portable memory, a portable disk, or a memory associated with another computing resource (e.g., enabling MRIs to be transferred and/or executed across a network such as the Internet).

The MRM 444 can be in communication with the processing resources 440 via a communication path 460. The communication path 460 can be local or remote to a machine (e.g., a computer) associated with the processing resources 440. Examples of a local communication path 460 can include an electronic bus internal to a machine (e.g., a computer) where the MRM 444 is one of volatile, non-volatile, fixed, and/or removable storage medium in communication with the processing resources 440 via the electronic bus.

The communication path 460 can be such that the MRM 444 is remote from the processing resources (e.g., 440), such as in a network connection between the MRM 444 and the processing resources (e.g., 440). That is, the communication path 460 can be a network connection. Examples of such a network connection can include a local area network (LAN), wide area network (WAN), personal area network (PAN), and the Internet, among others. In such examples, the MRM 444 can be associated with a first computing device and the processing resources 440 can be associated with a second computing device (e.g., a Java® server). For example, a processing resource 440 can be in communication with a MRM 444, wherein the MRM 444 includes a set of instructions and wherein the processing resource 440 is designed to carry out the set of instructions.

As used herein, "logic" is an alternative or additional processing resource to execute the actions and/or functions, etc., described herein, which includes hardware (e.g., various forms of transistor logic, application specific integrated circuits (ASICs), etc.), as opposed to machine executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for balancing the allocation of virtual machines (VMs) in cloud systems, comprising:
   determining a number of relationships of a plurality of nodes in a cloud system; and
   assigning a number of VMs including a non-high performance computing (HPC) type of VM having a first execution profile and a non-HPC type of VM having a second execution profile that compliments the first execution profile to the plurality of nodes in response to a request based on a criteria of the request and the number of relationships of the plurality of nodes to balance the allocation of VMs in the cloud system, wherein the criteria include a type, a requested amount of capacity, and a priority for each of the number of VMs, wherein the non-HPC type of VM having the first execution profile and the non-HPC type of VM having the second execution profile are assigned to a node of the plurality of nodes.

2. The method of claim 1, wherein assigning the number of VMs to the plurality of nodes comprises oversubscribing the node by assigning at least two VMs to one CPU core of the node.

3. The method of claim 2, wherein a result of oversubscribing the CPU core is that a first VM assigned to the CPU core runs during idle time of a second VM having a comparatively higher priority assigned to the CPU core.

4. The method of claim 1, wherein one of the number of relationships comprises an available capacity of each of the plurality of nodes including a number of available CPU cores and an available amount of memory; and wherein the method comprises assigning the number of VMs in an order of increasing available capacity.

5. The method of claim 4, wherein assigning the number of VMs in an order of increasing available capacity comprises determining if the available capacity is suitable for a node of the plurality of nodes, wherein:
   if it is determined the capacity of the node is unsuitable, then the method includes determining if the capacity of another node of the plurality of nodes having the same number of hops is suitable;
   if it is determined that all nodes having the same number of hops are unsuitable, then increasing the number of hops incrementally and determining if a node of the plurality of nodes at the increased hop distance is suitable until a node having a suitable available capacity is determined; and
   if it is determined the available capacity of the node is suitable, then the method includes assigning a VM of the number of VMs to the node.

6. The method of claim 4, wherein assigning the number of VMs comprises assigning based upon a weighted average of a number of available CPU cores compared to an amount of available memory for a given node of the plurality of nodes.

7. The method of claim 1, wherein one of the number of relationships comprises a proximity relationship between the plurality of nodes comprising a number of hops between the plurality of nodes and wherein the method comprises assigning the number of VMs in an order of an increasing number of hops.

8. A non-transitory machine-readable medium storing a set of instructions for balancing the allocation of virtual machines (VMs) in cloud systems executable by a processor to cause a computer to:
   determine a number of relationships of a plurality of nodes in a cloud system, wherein the number of relationships include a proximity relationship and a capacity of each of the plurality of nodes, wherein the proximity relationship comprises a number of hops between respective nodes, and wherein the capacity includes a number of available CPU cores and an available amount of memory; and assign a number of VMs to the plurality of nodes in response to a request based on a criteria of the request and the number of relationships of the plurality of nodes to balance the allocation of VMs in the cloud system, wherein the criteria include a type, a requested amount of capacity, and a priority for each of the number of VMs, wherein a node of the plurality of nodes is assigned a non-high performance computing (non-HPC) type of VM and an HPC type of VM having complimentary execution profiles.

9. The medium of claim 8, wherein the number of VMs host a number of applications.

10. The medium of claim 8, wherein a priority assigned to the number of VMs is dynamically changed during runtime.

11. A system for balancing the allocation of virtual machines (VMs) in cloud systems, comprising:
  a memory resource; and
  a processor resource coupled to the memory to implement;
    a receive module to receive a request including a number of VMs including a non-high performance computing (non-HPC) type of VM having a first execution profile;
    a determine module to determine a number of relationships of a plurality of nodes in a cloud system, wherein the number of relationships include a proximity relationship comprising a number of hops between a first node and a second node of the plurality of nodes;
    an assign module to simultaneously assign the number of VMs to the plurality of nodes in response to the request based on a criteria of the request, the number of relationships of the plurality of nodes to balance the allocation of VMs in the cloud, wherein the assign module assigns the non-HPC VM to a node of the plurality of nodes having a non-HPC type of VM with a second execution profile that compliments the first execution profile, and wherein the criteria include a type, a requested amount of capacity, and a priority for each of the number of VMs.

12. The system of claim 11, wherein a change module dynamically changes the priority of the number of VMs during runtime based upon monitoring of the number of VMs.

13. The system of claim 11, wherein the number of relationships determined by the determine module comprise homogeneity relationships and the number of VMs are assigned by the assign module to a node of the plurality of nodes that satisfies a homogeneity criteria of the request.

* * * * *

UNITED STATES PATENT AND TRADEMARK OFFICE
CERTIFICATE OF CORRECTION

PATENT NO.       : 9,184,982 B2
APPLICATION NO.  : 13/741949
DATED            : November 10, 2015
INVENTOR(S)      : Gupta et al.

It is certified that error appears in the above-identified patent and that said Letters Patent is hereby corrected as shown below:

In the Claims

Col. 14, line 4, Claim 11, delete "nodes," and insert --nodes; and--, therefor.

Signed and Sealed this
Twelfth Day of April, 2016

Michelle K. Lee
*Director of the United States Patent and Trademark Office*